C. A. ROMAN.
DEVICE FOR CONTROLLING THE GROWTH OF COTTON PLANTS.
APPLICATION FILED JULY 16, 1912.
1,055,231. Patented Mar. 4, 1913.
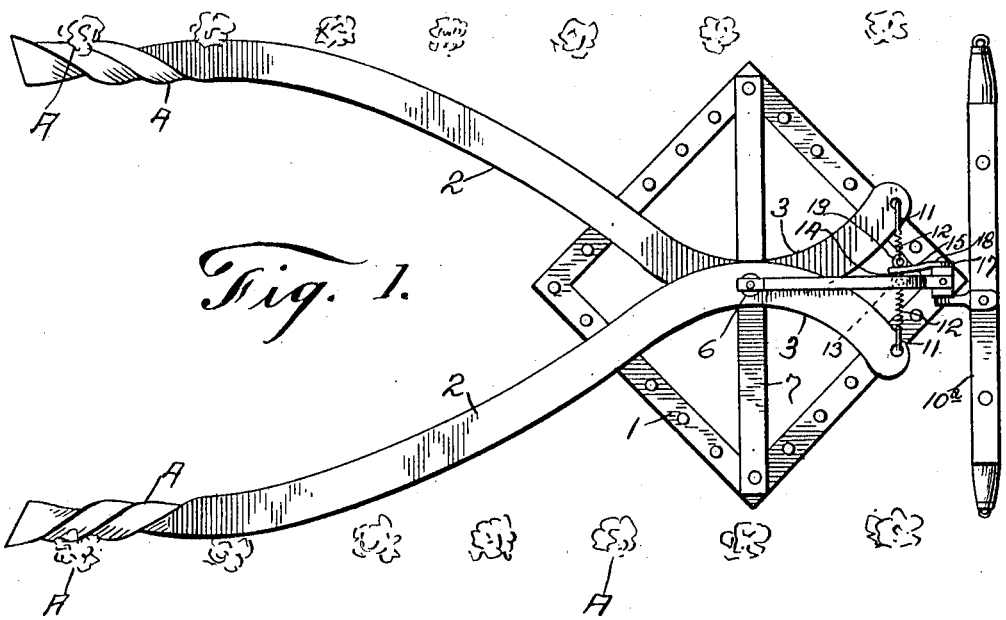
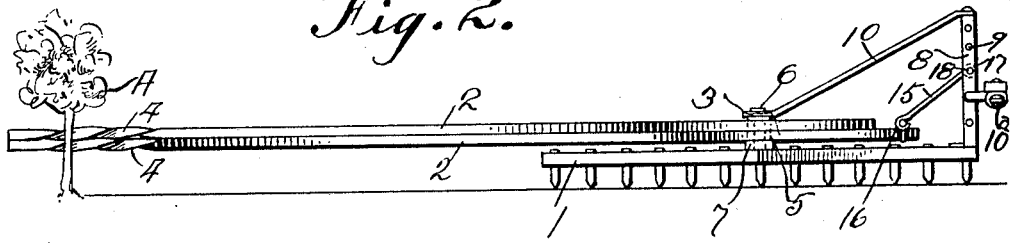
Witnesses
Francis K. MacNerhany.
A. M. Cullman.
Inventor
Chas. A. Roman.
By
Attorney

UNITED STATES PATENT OFFICE.

CHARLES A. ROMAN, OF HYDRO, OKLAHOMA, ASSIGNOR OF ONE-HALF TO LONNIE L. BROWN, OF BUTLER, OKLAHOMA.

DEVICE FOR CONTROLLING THE GROWTH OF COTTON-PLANTS.

1,055,231.  Specification of Letters Patent.  Patented Mar. 4, 1913.

Application filed July 16, 1912.  Serial No. 709,664.

*To all whom it may concern:*

Be it known that I, CHARLES A. ROMAN, a citizen of the United States, residing at Hydro, in the county of Caddo and State of Oklahoma, have invented certain new and useful Improvements in Devices for Controlling the Growth of Cotton-Plants, of which the following is a specification.

My invention relates to devices for retarding the growth of vegetation such as cotton plants.

In the cultivation of cotton plants, it is found necessary after a rain to go through the field and nick or cut the stalks of the plants near the ground to allow the sap to exude therefrom so as to prevent the growth of foliage on the plant, or rather to retard said growth, that would be a detriment to the filling out of the bolls.

My invention has for its object the provision of a machine that is adapted to scar or cut the stalks of the cotton plants, said machine being attached to a harrow or drag that is used to cultivate the plants at the same time that the scarring process is carried on, and also has means provided for adjusting the cutting blades relatively to the ground as desired by the operator.

My invention will be described in detail hereinafter and illustrated in the accompanying drawings, in which, Figure 1 is a top plan view showing my improved growth retarder mounted on a rectangular harrow and operating between two rows of growing plants; and Fig. 2, a side view partly broken away of the harrow and growth retarder.

In the drawings similar reference characters will be used to designate corresponding parts throughout the several views.

My improved growth retarder is as stated, shown mounted on a harrow of the rectangular type indicated at 1, but it will be apparent that a harrow of any other shape may be substituted therefor, or if desired, a drag may be used instead of the harrow, this part of the device, however, not being a part of my invention but merely providing means for carrying the growth retarder which consists of two arms designated 2, and as shown in Fig. 1 formed in the shape of a compound curve with the forwardmost parts of the arms 3 curved more sharply than the rearwardmost parts, while the extreme rear terminals of the arms are formed substantially parallel and twisted as shown at 4 and having the twisted edges provided with cutting surfaces adapted to engage and scar or cut the stalks of the growing plants indicated at A. The arms 2 are provided with slots 5 in the forwardmost curved portions 3 to receive a pivot pin 6 secured through a cross bar 7 mounted on the harrow frame 1.

8 indicates a vertical bar secured to the forwardmost portion of the harrow frame 1 that is provided with a series of transverse openings 9 for the purpose to be hereinafter stated.

10 indicates a draft bar connecting the upper terminal of the bar 8 with the pivot pin 6, and 10ª indicates a suitable draft appliance secured in one of the transverse openings 9. The forwardmost terminals of the arms 2 have links 11 secured thereto, and 12 indicates helical springs secured to said links 11 by one of their terminals, while their other terminals are secured in eyes 13 on the extremities of a rod 14.

15 indicates a rod secured by means of a hook 16 on one of its terminals to the rod 14, while its other terminal is provided with an eye loop 17 to receive a pin 18 secured through one of the openings 9.

In operation, it will be apparent that by dragging the harrow frame 1 with the arms 2 mounted thereon between the rows of cotton plants that the rear extremities 4 of said arms will be held in engagement with the cotton plants by means of the tension of the helical springs 12 connected with the forward terminals of said arms, and that the cutting edges of the twisted rear extremities of the arms will scar or cut the bark of the stalk of the plant to allow the sap to exude therefrom and retard the growth of the foliage of said plants. It will be furthermore understood that the height of the scarring may be adjusted relatively to the ground as desired by the operator by arranging the rod 15 in the openings 9 in the vertical bar 8 on the harrow frame 1.

Having thus described my invention what I claim is:—

1. A device for retarding the growth of plants comprising arms pivotally secured together and adapted to be dragged between the rows of growing plants, said arms having twisted portions formed with cutting edges to engage and cut the plant stalks.

2. A device for retarding the growth of plants comprising two arms pivotally secured together and adapted to be dragged between two rows of growing plants, said arms being provided with cutting edges adapted to engage the stalks of the plants, and resilient means for holding said cutting edges in engagement with the plant stalks.

3. A device for retarding the growth of plants comprising two arms pivotally secured together and adapted to be dragged between two rows of cotton plants, said arms being provided with cutting edges adapted to engage the stalks of the plants, resilient means for holding said cutting edges in engagement with the plant stalks, and means to regulate the height of said cutting edges relatively to the surface of the ground.

4. In combination with a dragging frame, arms pivotally secured to said frame, the rear terminals of said arms being provided with cutting edges, the forward terminals of said arms being resiliently connected together, a vertical bar secured to the forwardmost portion of the dragging frame and provided with a series of holes vertically arranged, and a rod connected to the forwardmost terminals of said arms and adapted to engage one of said holes in the vertical bar.

5. In combination with a dragging frame, arms formed in compound curves and pivotally secured to said dragging frame adjacent to their forwardmost terminals, the rearmost terminals of said arms being twisted and provided with cutting edges, links pivotally secured to the forwardmost terminals of said arms, a bar having a loop on each of its terminals, springs connecting said links and the loops on the terminals of said bar, a rod secured to said bar, a vertical bar secured to said dragging frame and provided with a series of holes, a draft appliance secured to said bar, the rod aforesaid being adapted to be secured in one of the vertical holes aforesaid.

In testimony whereof I affix my signature in presence of two witnesses.

CHARLES A. ROMAN.

Witnesses:
R. O. MILLER,
H. C. LACY.

---

Copies of this patent may be obtained for five cents each, by addressing the "Commissioner of Patents, Washington, D. C."